3,640,911
PHENOLIC FOAM PROCESS
Anthony Joseph Papa, St. Albans, and William Robert Proops, Charleston, W. Va., assignors to Union Carbide Corporation, New York, N.Y.
No Drawing. Filed Apr. 4, 1969, Ser. No. 813,726
Int. Cl. C08g 53/10
U.S. Cl. 260—2.5 F               13 Claims

ABSTRACT OF THE DISCLOSURE

Phenolic foams are produced containing a minor amount of an olefin epoxide as a catalyst promoter. The epoxides contain an oxirane group and are free of etheric oxygen. Illustrative thereof are isobutylene oxide, vinylcyclohexene dioxide, glycidol or 3,4-epoxycyclohexylmethyl 3,4-epoxycyclohexanecarboxylate.

---

This invention relates to an improved process for the production of phenolic foams.

In United States Letters Patent No. 3,298,973 there was disclosed a method for producing non-burning- non-punking-phenolic foams by the catalytic reaction of a liquid phenolaldehyde resole resins having a viscosity of about 200 to about 300,000 centipoises at 25° C. The catalyst used is a mixture of at least two acidic agents, one of which is boric acid, or its anhydride, and the other is an organic hydroxyl acid in which the hydroxyl group is on a carbon atom not more than one carbon atom removed from a carboxyl group. The methods disclosed in said patent and the reactants necessary therefor are herein incorporated by reference.

It is also well known that other acidic catalysts such as mineral acids or strong organic acids, e.g., hydrochloric acid, sulfuric acid, phosphoric acid, fluoboric acid, toluene sulfonic acid, formic acid, xylene sulfonic acid, phenol sulfonic acid, and the like, can be used in the foaming and curing of the phenol-aldehyde resole resins.

The previous processes, while producing cured products had the disadvantage that they were characterized by a relatively long onset of polymerization, as measured by cream time. That is, an appreciably long period of time transpired between the time when all of the reactants, including the catalyst, were mixed, and the time when the mixture started to cream or foam. In some instances the cream time was so prolonged that the blowing agents escaped from the mixture and a foam was not produced, or the rise time and cure time were so slow that the process was not commercially attractive.

It has now been found that the production of foams from phenol-aldehyde resole resins can be markedly accelerated. It has been found that in general the cream time, rise time, and tack-free time can be markedly shortened; further, it has been found that in some instances foams can be produced under conditions which otherwise would not produce foams.

According to the present invention, the addition of certain epoxides to the reaction mixture results in the marked acceleration of the foaming reaction. The suitable epoxides are those epoxide compounds containing at least one oxirane, $$-\underset{\diagdown O \diagup}{C}-\underset{}{C}-$$

ring in the molecule and no etheric oxygen, —O—, atom. The oxirane ring can be on an acyclic chain or on a cycloaliphatic ring, e.g.

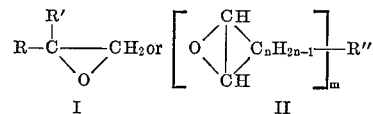

I              II wherein R can be hydrogen or alkyl having from 1 to about 6 carbon atoms; R' can be alkyl having from 1 to about 6 carbon atoms, hydroxyalkyl having from 1 to about 6 carbon atoms, aryl, cycloalkyl having from 5 to about 7 ring carbon atoms, or epoxycycloalkyl having from 5 to about 7 ring carbon atoms; R" can be a

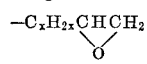

group, a $-C_xH_{2x}COOC_zH_{2z}(OOCC_xH_{2x})_y-$ group or a $-C_xH_{2x}COO$ arylene$(OOCC_xH_{2x})_y-$ group; $n$ is an integer having a value of 3 or 4; $m$ has a value of 1 or 2; $x$ has a value of from 0 to about 6; $z$ has a value of from 1 to about 6; and $y$ has a value of 0 or 1. Subgeneric to Formula II are the following compounds:

IIA

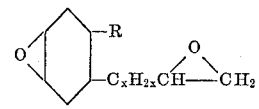

IIC

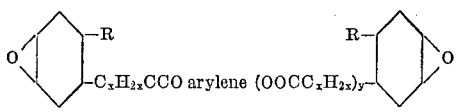

IIB

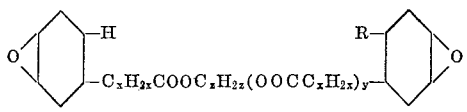

The arylene group can contain from 6 to 14 ring carbon atoms such as phenylene, naphthylene, anthracylene, phenanthrylene, and the like.

Illustrative of suitable epoxides of Formula I one can mention 1,2-propylene oxide, 1,2-butylene oxide, 1,2-pentylene oxide, 1,2-hexylene oxide, styrene oxide, glycidol, 7 - hydroxy - 1,2 - heptylene oxide, 2 - methylstyrene oxide, vinylcyclopentane monoxide, vinyl-2-cyclopentane monoxide, vinylcyclohexane monoxide, isobutylene oxide, 2-methyl-1,2-hexylene oxide, 2-methyl-3-hydroxy-1,2-propylene oxide, alpha-methylstyrene oxide, 2-cyclohexyl-1,2-propylene oxide, 2-ethyl-1,2-pentylene oxide, 2-phenyl-1,2-hexylene oxide, 2-propyl-1,2-octylene oxide, and the like.

Illustrative of suitable compounds of Formula II one can mention vinylcyclohexene dioxide,
allylcyclohexene dioxide,
vinylcyclopentene dioxide,
hexenylcyclohexene dioxide
butenylcyclohexene dioxide,
2,3-epoxycyclopentylmethyl 2,3-epoxycyclopentanecarboxylate,
3,4-epoxycyclohexylmethyl 3,4-epoxycyclohexanecarboxylate,
3,4-epoxycyclohexylpropyl 3,4-epoxycyclohexanecarboxylate, 3,4-epoxycyclohexylhexyl 3,4-epoxyclohexane-carboxylate,
3,4-epoxycyclohexylphenyl 3,4-epoxycyclohexane-carboxylate,
3,4-epoxy-6-methylcyclohexylmethyl 3,4-epoxy-6-methylcyclohexanecarboxylate,
3,4-epoxy-6-propylcyclohexylmethyl 3,4-epoxy-6-propylcyclohexanecarboxylate,
2,3-epoxy-5-methylcyclopentylmethyl 2,3-epoxy-5-methylcyclopentanecarboxylate,
bis(3,4-epoxycyclohexyl)malonate,
bis(3,4-epoxycyclohexyl)glutarate,
bis(3,4-epoxycyclohexyl)adipate,
bis(3,4-epoxycyclohexyl)suberate,
bis(2,3-epoxycyclopentyl)adipate,
bis(3,4-epoxycyclohexyl)phthalate,
bis(3,4-epoxycyclohexylmethyl)adipate,
bis(3,4-epoxy-6-methylcyclohexyl)succinate,
bis(3,4-epoxy-6-propylcyclohexyl)adipate,
bis(2,3-epoxy-5-methylcyclopentyl)adipate,
bis(3,4-epoxy-6-methylcyclohexylmethyl)adipate,
bis(3,4-epoxy-6-hexylcyclohexyl)adipate,
3,4-epoxycyclohexylpropionate,
bis(3,4-epoxy-6-methylcyclohexyl)phthalate,
bis(3,4-epoxy-6-butylcyclohexyl)glutarate, and the like.

The concentration of the epoxide compound can vary from about 2 to about 40, preferably from about 10 to about 25 parts thereof per 100 parts of phenol-aldehyde resole resin used in the formulation. Any minor amount sufficient to accelerate the reaction can be used.

The phenol-aldehyde condensation products employed in this invention are not narrowly critical and are well known in the art for making phenolic foams. They are commonly called one-step resins or "resoles," being the condensation reaction products of a monohydric phenol and an aldehyde. Preferred are the resins of phenol per se and formaldehyde although other phenols such as meta cresol, meta xylenol and the like can as well be employed as can mixtures of phenol and ortho cresol. Similarly, the formaldehyde can be replaced by other aldehydes or aldehyde liberating compound such as paraformaldehyde, Formalin and the like.

The liquid resole resins are the alkaline-catalyzed condensates which are carried to only a mild state of resinification so that they are normally liquid and generally water-soluble. This is often referred to as the A state of resinification, the C stage being the fully cured thermoset resin stage.

As the condensation between the phenol and aldehyde progresses from the liquid low molecular weight resins, the molecular weight of the condensation product increases and the resin exhibits a corresponding increase in viscosity. Since the addition of small amounts of the blowing agent may increase or decrease the viscosity of the liquid resins, the viscosity of the foamable composition is not narrowly critical, but is dependent to a degree on the amount of blowing agent present. Typical foamable resole compositions employable herein would include those which have an initial viscosity at 25° C. ranging from about 200 centipoises to about 300,000 centipoises, with those having a viscosity ranging from about 400 to about 25,000 centipoises being preferred for easiest handling.

Minor amounts of water can be tolerated in these resins although it is preferred that water content be kept to less than 10% by weight of resin.

Advantages are also made of mixtures of several different resole resins in order to control the initial viscosity and reactivity of the foamable compositions. For example, mixtures of high viscosity and a low viscosity resin have been used to control the ultimate density of foam.

Similarly, mixtures of liquid and solid resole can be employed to the same effect.

It is contemplated in the invention that any resole resin either initially liquid or made fluid by the addition of any agent or by any technique can be employed in this invention.

The foaming of the compositions can be induced by heat or reduction of pressure alone. However, heat is generally in order to advance the foamed resin to a thermoset state. When the mixture of resole resin and a volatile organic blowing agent is employed, the exothermic curing reaction of the condensation reaction is catalyzed by the use of acid catalysts, the exotherm is of such a magnitude to not only volatilize all of the water of condensation and/or any water initially present but also all of the organic blowing agents even those having boiling points as high as 200° F. or more.

While these organic "foam assists" or foaming agents are not essential or critical in this invention, they are immeasurably beneficial in providing uniform and highly desirable results. The preferred foam assists have atmospheric boiling points from —40° F. to 200° F., and are normally aliphatic hydrocarbons, oxyhydrocarbons, or halohydrocarbons such as alkyl ethers, ketones, lower alkanes and halogenated alkanes as for example pentane, hexane, diethyl ether, diisopropyl ether, acetone, dichloromethane, dichloroethane and the like. Most of these agents provide an open-celled foam highly desirable for use where its liquid "wicking" properties are desirable as a source of moisture for making floral arrangements and the like.

A closed-cell phenolic foam is provided with polyhalogenated saturated fluorocarbons having more than one halogen atom bonded to aliphatic carbon atoms, in which at least one is fluorine, and which compound is free of aliphatic and aromatic unsaturation, and is illustrated by the following species.

| Foaming agent: | Atmospheric pressure boiling point, ° F. |
|---|---|
| Monochlorodifluoromethane | —41 |
| Dichlorodifluoromethane | —21.6 |
| 1,2-dichloro-1,1,2,2-tetrafluoroethane | 38.4 |
| 1,1,1-trichloro-2,2,2-trifluoroethane | 45.8 |
| 1,2-difluoroethane | 50 |
| Trichloromonofluoromethane | 74.8 |
| 1,1,2-trichloro-1,2,2-trifluoroethane | 117.6 |
| 1,1,2,2-tetrachloro-2,2-difluoroethane | 196.7 |
| 1,1,1,2-tetrachloro-2,2-difluoroethane | 199 |

However, other blowing agents, be they such fluorocarbons or other agents, having a boiling point from about —40 to +200° F. can be used alone or in combination if desired. A plurality or mixture of any of such blowing agents can be employed, in which each is designed to volatilize at a different temperature so as to give volatilization at its respective different temperature throughout the exothermic curing reaction to provide "froth" foaming techniques, i.e. where one agent having a high volatilization rate at the ambient temperature and pressure first foams the resin composition and another which volatilizes at a higher temperature does additional foaming of the resin once the acid mixture initiates the condensation reaction exotherm.

The amount of the foaming assist is not narrowly critical. When it is employed, amounts of from 2 to 50 parts per 100 parts by weight of resin are most desirable, provided that the foamable composition is relatively viscous i.e. above about 200 cps. Some of these foaming agents have a rather severe dilution effect on the viscosity of the resole resin and cannot be used in the larger amounts. Methylene chloride for example can be employed in amounts only up to about 6 parts per hundred parts of resin whereas, acetone can be employed in amounts up to about 15 parts and diisopropyl ether in amounts up to 20 parts per hundred parts of resin. Because of the unusual solubility phenomena of fluorocarbons, they can be employed in much greater amounts, even up to 50 parts of such agents per hundred parts of resin can be employed. Upon the addition of a fluorocarbon to the resole resin there is no appreciable decrease in viscosity, in fact, there is often an increase in viscosity which remains high during the initial stages of curing and aid in the closed cell nature of the foam and the entrapment of the volatilized fluorocarbon.

However, the density of the foam is directly related to the amounts of the blowing agent employed and the rapidity with which the exotherm is developed by the catalyst. The most useful foams commercially are those having densities from about 0.2 to 20 pounds per cubic foot which can be secured by a fast exotherm on a composition without any blowing agent but which can be more controllably developed when a blowing agent is present.

The blowing agents tend to act as nucleating agents for the foam development to provide for cell sites. Hence, a finer cell foam can be made using a blowing agent and particularly fine celled foamed is secured with the fluorocarbons since they are soluble in the resole resin in much larger amounts than other agents and do not decrease the viscosity of the resin.

For most applications, it is preferred that the blowing agent be employed in amounts from about 2 to 20 parts per hundred parts of resin.

It has also been found that further advantages are secured in this system when a surface active agent also is employed as an additional control over the cell size in the foam. While it has been found that the cell size using the fluorocarbons is very fine, additional improvements in uniformity and size are secured by the use of a surface active agent. Particularly useful are the nonionic types such as the polyethers and polyalcohols, such as condensation products of alkylene oxides (such as ethylene oxide and propylene oxide) with alkyl phenols, fatty acids, alkyl silanes and silicones and like materials, as is exemplified by such products as octadecyl phenol-ethylene oxide, decyl phenolethylene oxide sulfate and the low polymers of such materials as polyoxyethylene dodecyl phenol, octyl phenol polyethylene glycol ether, ricinoleic acid polyethylene glycolate, stearic acid polyoxyethylene glycolates, and similar polyoxyethylated fatty acids and vegetable oils as well as polyoxyethylated fatty acid esters as polyoxyethylene sorbitan monolaurate, polyoxyethylene sorbitan tristearate, polyoxypropylene sorbitan monolaurate, polyoxy(propylene-ethylene)sorbitan monolaurate, and polyoxyethylene sorbitan pentaoleate; polyoxyethylene sorbitan monopalmitate, the siloxane-oxyalkylene block copolymers such as those containing a Si—O—C linkage between the siloxane and oxyalkylene moieties and those containing a Si—C linkage between the siloxane and oxyalkylene moieties. Typical siloxane-oxyalkylene block copolymers contain a siloxane moiety composed of recurring dimethylsiloxy groups end-blocked with monomethylsiloxy and/or trimethylsiloxy groups and an oxyalkylene moiety composed or recurring oxyethylene and/or oxypropylene groups end-blocked with alkoxy groups. Similarly useful are the quaternary ammonium compounds with at least 2 alkyl groups attached to the nitrogen atom like cetyl dimethyl benzyl ammonium chloride, octadecyl dimethyl benzyl ammonium chloride, octadecanol-9-dimethyl ethyl ammonium bromide, and diisobutylphenoxyethoxy ethyl dimethyl benzyl ammonium chloride, and sorbitan fatty acid esters such as sorbitan monolaurate, sorbitan monopalmitate, sorbitan monstearate, sorbitan trioleate and like esters.

When present, these surface active agents can be employed in any desired amount depending on what results are desired. They serve to aid the nucleation for generation of smaller and more uniform cells. If the selected blowing agent also serves as a nucleation agent, very little or no surface active agent is needed. Best results seem to be secured in using amounts from 0.3 to about 5 percent by weight of the agent based on the weight of resole resin, with preferred results at between about 0.5 to 3 percent by weight. Certain surfactants may cause collapse of the foam if employed in too great a concentration, and optimum concentrations vary with the individual surfactant selected.

It is to be understood that in the foamed resins of this invention, there may also be present other ingredients and agents to impart other desirable properties such as pigments, dyes, fillers, stabilizers, neutralizers, flameproofers, fiber glass, asbestos, silica, and solid nucleating agents and like additives without departing from this invention. In fact, certain beneficial properties result from many such additives. For example, fluorocarbon blown foams accept and tolerate a high filler loading because of the more efficient blowing agent. Also if desired, thermoplastic resins or modifiers such as polyvinyl alcohol, vinyl halide resins, and other similar thermoplastics can be used to improve toughness and other similar properties.

The use of the epoxide compounds shown in this invention unexpectedly results in the reduction of the cream time and rise time to about one-fourth to one-fifth of their original values. It was also unexpectedly found that these beneficial results were obtained only with those classes olefin epoxides hereinbefore defined. The ether-type epoxides such as phenyl glycidyl ether, bis-2,3-epoxycyclopentyl ether, the bis glycidyl ether of bis-phenol A and the polymeric novolac resin the reaction of phenyl glycidyl ether with hexamethylenetetraamine do not have the beneficial effects observed with the use of the olefin epoxides previously defined.

The following examples serve to illustrate the invention. The amounts indicated are on a weight basis and the term p.h.r. means the amount of material in parts per hundred parts by weight of the resole resin.

EXAMPLE 1

A blend was prepared by mixing together at room temperature 100 parts of a commercially available phenol-formaldehyde resole resin having a viscosity of about 5,000 centipoises at 25° C., 1 part of a surfactant having the empirical formula:

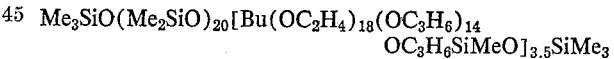

wherein Me is methyl and Bu is butyl, 6 parts of 1,1,2-trichloro-1,2,2-trifluoroethane as blowing agent and 5 parts of 3,4-epoxycyclohexylmethyl 3,4-epoxycyclohexanecarboxylate for about 30 seconds. Then 10 parts of concentrated hydrochloric acid were added, the mixture was vigorously stirred and then permitted to foam in a container 8 inches on each side. The mixture had a cream time of 8 seconds, a rise time of 75 seconds and a tack-free time of 55 seconds. The height of the phenolic foam was 6.5 inches and its density, after curing in an air oven at 70° C. for 15 minutes, was 2.46 pounds per cubic foot.

For comparative purposes a foam was produced under the same conditions and using the same components but without the epoxide compound. The cream time was 25 seconds, the rise time was 90 seconds and the tack-free time was 75 seconds. As can be seen, the cream time was three times longer. Further, the height of the phenolic foam was only 1.5 inches, less than one-fourth the height of the foam produced in Example 1 according to this invention. The foam density was also greater, 3.78 pounds per cubic foot.

EXAMPLE 2

A phenolic foam was produced as described in Example I using 100 parts of the same resole resin, 1 part of the same surfactant, 10 parts of the blowing agent, 30 parts of a 1:1 boric acid/oxalic acid catalyst mixture and 10 parts of vinylcyclohexene dioxide. The results are summarized in Table I.

EXAMPLE 3

A phenolic foam was produced as described in Example 2 but using 10 parts of 3,4-epoxycyclohexylmethyl 3,4-epoxycylclohexanecarboxylate as the sole epoxide present. The results are summarized in Table I.

For comparative purposes a reaction was carried out as described in Examples 2 and 3 without any epoxide present. A foam could not be obtained (Run A).

To show the non-suitability of ether-type epoxide compounds a reaction was carried out as described in Examples 2 and 3 using 10 parts of the bis glycidyl ether of bisphenol A as the epoxide. The reaction did not produce a foam (Run B).

TABLE I

|  | Ex. 2 | Ex. 3 | Run A | Run B |
|---|---|---|---|---|
| Cream time, seconds | 25 | 35 | No foam | No foam. |
| Rise time, seconds | 240 | 120 | | |
| Tack-free time, seconds | >300 | 280 | | |
| Foam height, inches | 11 | 7.5 | | |
| Foam density, p.c.f | 3.00 | 4.25 | | |

EXAMPLE 4

A phenolic foam was produced as described in Example 1 using 100 parts of the same resole resin, 1 part of the same surfactant, 10 parts of the same blowing agent, 8 parts of a 48 percent aqueous fluoric acid solution and 5 parts of 3,4-epoxycyclohexylmethyl 3,4-epoxycyclohexanecarboxylate. The results are summarized in Table II.

EXAMPLE 5

A phenolic foam was produced as described in Example 4 but using 5 parts of vinylcyclohexene dioxide as the sole epoxide present. The results are summarized in Table II.

For comparative purposes a reaction was carried out as described in Examples 4 and 5 without any epoxide present. The cream time and rise times were appreciably longer and the foam height was much less (Run C).

TABLE II

|  | Ex. 4 | Ex. 5 | Run C |
|---|---|---|---|
| Cream time, seconds | 8 | 10 | 45 |
| Rise time, seconds | 70 | 40 | 105 |
| Tack-free time, seconds | 40 | 60 | 90 |
| Foam height, inches | 6.5 | 12.5 | 3.0 |
| Foam density, p.c.f | 2.39 | 2.09 | 3.65 |

EXAMPLE 6

A phenolic foam was produced as described in Example 1 using 100 parts of the same resole resin, 1 part of the same surfactant, 10 parts of the same blowing agent, 25 parts of oxalic acid as catalyst and 10 parts of 3,4 - epoxycyclohexylmethyl 3,4 - epoxycyclohexanecarboxylate. The results are summarized in Table III.

EXAMPLE 7

A phenolic foam was produced as described in Example 6 but using 25 parts of vinylcyclohexene dioxide as the sole epoxide present. The results are summarized in Table III.

For comparative purposes a reaction was carried out as described in Examples 6 and 7 without any epoxide present. The reaction did not produce a foam (Run D).

To show the non-suitability of ether-type epoxides a reaction was carried out as described in Examples 6 and 7 using 10 parts of phenyl glycidyl ether as the epoxide. The reaction did not produce a foam (Run E).

TABLE III

|  | Ex. 6 | Ex. 7 | Run D | Run E |
|---|---|---|---|---|
| Cream time, seconds | 75 | 40 | No foam | No foam. |
| Rise time, seconds | 185 | 130 | | |
| Tack-free time, seconds | | 300 | | |
| Foam height, inches | 5.0 | 9.0 | | |
| Foam density, p.c.f | 2.38 | 4.34 | | |

EXAMPLE 8

A phenolic foam was produced as described in Example 1 using 100 parts of the same resole resin, 1 part of the same surfactant, 6 parts of the same blowing agent, 25 parts of formic acid (90.7 percent) as catalyst and 15 parts of vinylcyclohexene dioxide. The results are summarized in Table IV.

For comparative purposes a reaction was carried out as described in Example 8 without any epoxide present. The reaction did not produce a foam (Run F).

To show the non-suitability of ether-type epoxides two reactions were carried out as described in Example 8 using 25 parts of oxalic acid as catalyst. In the first reaction 10 parts of bis-2,3-epoxycyclopentyl ether were used (Run G) and in the second reaction 10 parts of the bis glycidyl ether of bisphenol A were used (Run H); the reactions did not produce foams.

TABLE IV

|  | Ex. 8 | Run F | Run G | Run H |
|---|---|---|---|---|
| Cream time, seconds | 8 | No foam | No foam | No foam. |
| Rise time, seconds | 260 | | | |
| Foam height, inches | 6.5 | | | |

A series of experiments were carried out to produce phenolic foams using a reaction mixture without epoxide and using reaction mixtures with epoxides. The experiments containing the epoxide had appreciably shorter cream times and the phenolic foams had a greater height. The reactions were conducted as described in Example 1 using 100 parts of a commercially available phenol-formaldehyde resole resin having a viscosity of about 5,000 centipoises at 25° C., 1 part of the same surfactant and 12 parts of the same blowing agent. The catalyst and epoxides used are indicated in Table V.

TABLE V

| Example | Epoxide Type | Epoxide Parts | Catalyst Type | Catalyst Parts | Cream time, seconds | Rise time, seconds | Foam height, inches |
|---|---|---|---|---|---|---|---|
| Control | None | | (1) | | 30 | 109 | 422 | 5.0 |
| 9 | (a) | 5 | (1) | | 30 | 60 | 235 | 6.75 |
| 10 | (a) | 10 | (1) | | 30 | 28 | 170 | 6.75 |
| 11 | (b) | 5 | (1) | | 30 | 45 | 180 | 5.5 |
| 12 | (b) | 10 | (1) | | 30 | 12 | 120 | 7.0 |
| 13 | (c) | 5 | (1) | | 30 | 55 | 210 | 7.0 |
| 14 | (c) | 10 | (1) | | 15 | 45 | 165 | 7.0 |
| 15 | (d) | 15 | (1) | | 10 | 30 | 180 | 6.0 |
| 16 | (d) | 5 | (1) | | 10 | 45 | >400 | 5.5 |
| Control | None | | (2) | | 8 | 20 | 50 | |
| 17 | (a) | 8 | (2) | | 8 | 5 | 75 | |
| 18 | (a) | 6 | (2) | | 3 | 22 | | |
| 19 | (a) | 10 | (2) | | 5 | 12 | | |
| Control | None | | (3) | | 30 | 27 | 120 | 6.0 |
| 20 | (a) | 3 | (3) | | 20 | 10 | 180 | 6.5 |

1 1:1 weight mixture of boric acid and oxalic acid.
2 Concentrated hydrochloric acid.
3 85 percent phosphoric acid.
a 3,4-epoxy-6-methylcyclohexylmethyl 3,4-epoxy-6-methylcyclohexanecarboxylate.
b Styrene oxide.
c Glycidol.
d Bis(3,4-epoxy-6-methylcyclohexylmethyl)adipate.

A series of experiments was carried out, following the procedure in Example 1, to produce phenolic foams, using reaction mixtures with the epoxides of this invention, with ether-type epoxides and without an epoxide. All of the phenolic foams were non-punking, as determined by directing a 1.5 inch flame from a propane torch on a 3 x 4 x 6 inch sample of the foam. The reaction mixtures without epoxide (Runs J and K) and those containing an ether-type epoxide (Runs L to P) had appreciably greater cream time periods than did the reaction mixtures containing the epoxides found useful in this invention. The reaction mixtures used to produce the foams contained 100 parts of a commercially available phenol-formaldehyde resole resin, 1 part of the same surfactant used in Example 1 and 12 parts of the same blowing agent, except where otherwise indicated. The catalyst was 10 parts of a 1:1 mixture of boric acid and oxalic acid, unless otherwise indicated. The epoxides used are indicated in Table VI.

TABLE VI

| | Epoxide | | Cream time, seconds | Rise time, seconds |
|---|---|---|---|---|
| | Type | Parts | | |
| Example 21 | (a) | 5 | 55 | >600 |
| Example 22 | (a) | 15 | 28 | 180 |
| Example 23 | (b) | 5 | 18 | >600 |
| Example 24 | (b) | 15 | 11 | 43 |
| Run J [1] | None | | 100 | >600 |
| Run K [2] | do | | | |
| Run L | (c) | 5 | 270 | >600 |
| Run M | (c) | 15 | 180 | >600 |
| Run N | (d) | 5 | 110 | >600 |
| Run O | (e) | 5 | >300 | |
| Run P | (e) | 15 | 140 | >600 |

[1] Used 13 parts of blowing agent and 30 parts of catalyst; a foam was not obtained unless the reaction mixture was heated in an oven at 70° C. for a minimum of about 30 minutes.
[2] Used 14 parts of blowing agent.
a 3,4-epoxycyclohexylmethyl 3,4-epoxycyclohexanecarboxylate.
b Isobutylene oxide.
c Bis-2,3-epoxycyclopentyl ether.
d Phenyl glycidyl ether.
e Poly-[structure with $OCH_2CH-CH_2$ epoxide group on phenyl-$CH_2$ repeating unit]$_n$ having a viscosity of about 76,500 centipoises at 25° C.

A series of experiments was carried out following the procedure in Example 1 to produce phenolic foams. A reaction mixture of 100 parts of phenol-formaldehyde resole resin having a viscosity of about 5,500 centipoises at 25° C., 1 part of the same surfactant, 6 parts of the same blowing agent and 10 parts of a milled 1:1 mixture of boric acid and oxalic acid was used. The mixtures contained different amounts of 3,4-epoxy-6-methyl-cyclohexylmethyl 3,4 - epoxy-6-methylcyclohexanecarboxylate. As the concentration of epoxide increased, the cream time and rise time decreased. It was found that the milled catalyst did not confer non-punking characteristics to the foam.

For comparative purposes a reaction was carried out without the epoxide. In this instance 14 parts of blowing agent were used. The reaction did not produce a foam (Run Q). The results are summarized in Table VII.

TABLE VII

| | Epoxide, parts | Cream time, seconds | Rise time, seconds |
|---|---|---|---|
| Example: | | | |
| 25 | 5 | 35 | 420 |
| 26 | 10 | 27 | 220 |
| 27 | 15 | 20 | 145 |
| 28 | 20 | 15 | 110 |
| Run Q | None | 130 | (1) |

[1] No foam.

What is claimed is:

1. In a process for producing phenolic foam by the catalytic reaction of a liquid mixture comprising a phenol-aldehyde resole resin having a viscosity of about 200 to about 300,000 centipoises at 25° C. and acidic catalyst and a blowing agent, the improvement of adding to said mixture a minor accelerating amount of an olefin epoxide free of etheric oxygen having the formula:

$$R-\underset{\underset{R'}{|}}{C}\underset{\diagdown O \diagup}{-\!-\!-\!-}CH_2$$

and $$\left[\underset{\diagdown CH \diagup}{\overset{\diagup CH \diagdown}{O}}C_nH_{2n-1}\!-\!-\!-R''\right]_m$$

wherein R is hydrogen or alkyl of from 1 to 6 carbon atoms; R' is alkyl of from 1 to 6 carbon atoms, hydroxyalkyl of from 1 to 6 carbon atoms, aryl, cycloalkyl of from 5 to 7 ring carbon atoms or epoxycycloalkyl of from 5 to 7 ring carbon atoms; R" is $$-C_xH_{2x}\underset{\diagdown O \diagup}{CHCH_2}, \quad -C_xH_{2x}COOC_xH_{2x}(OOCC_xH_{2x})_y-$$

or $$-C_xH_{2x}COO\text{-arylene-}(OOCC_xH_{2x})_y-$$

$n$ has a value of 3 or 4; $m$ has a value of 1 or 2; $x$ has a value of 0 to 6; $z$ has a value of 1 to 6 and $y$ has a value of 0 or 1.

2. A process as claimed in claim 1 wherein the olefin epoxide has the formula:

[structure: epoxycycloalkyl-$C_xH_{2x}CH$—$CH_2$ with epoxide]

wherein R is hydrogen or alkyl of from 1 to 6 carbon atoms and $x$ has a value of 0 to 6.

3. A process as claimed in claim 1 wherein the olefin epoxide has the formula:

[structure with two epoxycycloalkyl groups linked by $-C_xH_{2x}COOC_xH_{2x}(OOCC_xH_{2x})_y-$]

wherein R is hydrogen or alkyl of from 1 to 6 carbon atoms; $x$ has a value of 0 to 6; $y$ has a value of 0 or 1 and $z$ has a value of 1 to 6.

4. A process as claimed in claim 1 wherein the olefin epoxide has the formula:

[structure with two epoxycycloalkyl groups linked by $-C_xH_{2x}COO$-arylene$(OOCC_xH_{2x})_y-$]

wherein R is hydrogen or alkyl of from 1 to 6 carbon atoms; arylene contains from 6 to 14 ring carbon atoms; $x$ has a value of 0 to 6 and $y$ has a value of 0 or 1.

5. A process as claimed in claim 1 wherein the olefin epoxide is present in an amount from about 2 to about 40 parts per hundred parts of resole resin.

6. A process as claimed in claim 1 wherein the olefin epoxide is present in an amount from about 10 to about 25 parts per hundred parts of resole resin.

7. A process as claimed in claim 1 wherein the olefin epoxide is 3,4-epoxycyclohexylmethyl 3,4-epoxycyclohexanecarboxylate.

8. A process as claimed in claim 1 wherein the olefin epoxide is vinylcyclohexene dioxide.

9. A process as claimed in claim 1 wherein the olefin epoxide is 3,4-epoxy-6-methylcyclohexylmethyl 3,4-epoxy-6-methyl cyclohexanecarboxylate.

10. A process as claimed in claim 1 wherein the olefin epoxide is styrene oxide.

11. A process as claimed in claim 1 wherein the olefin epoxide is glycidol.

12. A process as claimed in claim 1 wherein the olefin epoxide is bis(3,4-epoxy-6-methylcyclohexylmethyl)adipate.

13. A process as claimed in claim 1 wherein the olefin epoxide is isobutylene oxide.

References Cited

UNITED STATES PATENTS

| | | | |
|---|---|---|---|
| 3,215,648 | 11/1965 | Duffy et al. | 260—2.5 F |
| 3,271,331 | 9/1966 | Ender | 260—2.5 F |
| 3,389,094 | 6/1968 | D'Alessandro | 260—2.5 F |
| 3,389,095 | 6/1968 | Garrett | 260—2.5 F |
| 3,436,373 | 4/1969 | Cox et al. | 260—2.5 F |

JOHN C. BLEUTGE, Primary Examiner

U.S. Cl. X.R.

260—2.5 EP, 38, 826, 831, 832, 836, 844, 847

UNITED STATES PATENT OFFICE
CERTIFICATE OF CORRECTION

Patent No. 3,640,911                    Dated February 8, 1972

Inventor(s) A. J. Papa & W. R. Proops

It is certified that error appears in the above-identified patent and that said Letters Patent are hereby corrected as shown below:

Col. 1, line 23, after "non-burning", "-" should be ",".

Col. 2, line 30, "$-C_xH_{2x}CCO-$" should be "$-C_xH_{2x}COO-$".

Col. 2, line 35, so much of the formula as reads

" 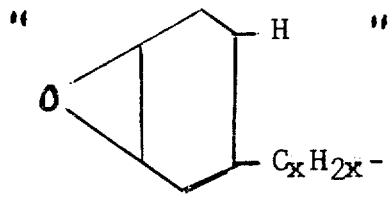 "    should read    " 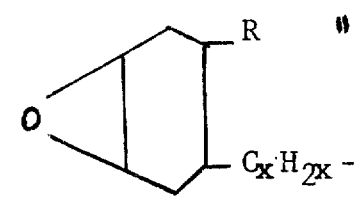 "

Col. 3, line 43, "Formalin" should be "formalin".

Col. 5, line 20, after "celled", "foamed" should be "foam".

Col. 5, line 58, after "composed", "or" should be "of".

Col. 5, line 68, "monstearate" should be "monostearate".

Col. 7, line 27, after "aqueous", "fluoric" should be "fluoroboric".

Col. 7, line 34, "vinylyclohexene" should be "vinylcyclohexene".

Signed and Sealed this twenty-seventh Day of April 1976

[SEAL]

Attest:

RUTH C. MASON
*Attesting Officer*

C. MARSHALL DANN
*Commissioner of Patents and Trademarks*